(12) United States Patent
Kadle et al.

(10) Patent No.: US 7,007,493 B2
(45) Date of Patent: Mar. 7, 2006

(54) FRONT-END INTEGRAL AIR-CONDITIONING UNIT

(75) Inventors: Prasad S. Kadle, East Amherst, NY (US); Mahmoud Ghodbane, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/873,934

(22) Filed: Jun. 22, 2004

(65) Prior Publication Data

US 2005/0016196 A1 Jan. 27, 2005

Related U.S. Application Data

(60) Provisional application No. 60/488,900, filed on Jul. 21, 2003.

(51) Int. Cl.
*B60H 1/32* (2006.01)
(52) U.S. Cl. .............................. 62/244; 62/298; 62/299
(58) Field of Classification Search .......... 62/239–244, 62/298, 299, 430–439
See application file for complete search history.

(56) References Cited

U.S. PATENT DOCUMENTS

| | | | |
|---|---|---|---|
| 2,540,649 A * | 2/1951 | Boylan | 62/299 |
| 2,760,347 A * | 8/1956 | Dolza | 62/243 |
| 2,934,915 A | 5/1960 | Morse | 62/299 |
| 4,102,148 A | 7/1978 | Matthews et al. | |
| 4,184,661 A * | 1/1980 | Kushner et al. | 251/82 |
| 4,217,764 A | 8/1980 | Armbruster | |
| 4,321,797 A | 3/1982 | Yaeger et al. | |
| 4,909,046 A | 3/1990 | Johnson | |
| 4,926,655 A | 5/1990 | King | |
| 4,945,977 A | 8/1990 | D'Agaro | |
| 5,081,849 A | 1/1992 | Thompson et al. | |
| 5,097,829 A | 3/1992 | Quisenberry | |
| 5,172,557 A * | 12/1992 | Hubbell, Jr. | 62/77 |
| 5,222,372 A | 6/1993 | DeRees et al. | |
| 5,222,374 A | 6/1993 | Thompson et al. | |
| 5,408,843 A | 4/1995 | Lukas et al. | |
| 5,483,807 A | 1/1996 | Abersfelder et al. | |
| 5,605,055 A | 2/1997 | Salgado | |
| 5,609,037 A | 3/1997 | Fischler | |
| 5,718,119 A * | 2/1998 | Wakita et al. | 62/85 |
| 5,816,064 A | 10/1998 | Moore et al. | |
| 6,038,877 A | 3/2000 | Peiffer et al. | |
| 6,158,229 A * | 12/2000 | Aizawa | 62/77 |
| 6,196,008 B1 | 3/2001 | Fuitaka et al. | 62/77 |
| 6,209,330 B1 | 4/2001 | Timmerman et al. | |
| 6,230,508 B1 | 5/2001 | Baker et al. | |
| 6,260,376 B1 | 7/2001 | Khelifa et al. | |
| 6,263,689 B1 | 7/2001 | Dodge et al. | |

(Continued)

FOREIGN PATENT DOCUMENTS

EP   1 354 735 A1   10/2003

(Continued)

OTHER PUBLICATIONS

International Search Report—PCT/US04/22220—dated Jun. 13, 2005.

*Primary Examiner*—William E. Tapolcai
(74) *Attorney, Agent, or Firm*—Patrick M. Griffin

(57) ABSTRACT

A sub-unit for a vehicle air conditioning system is shipped with a condenser, chiller and fluid lines. Snap together couplings are placed on free ends of the fluid lines whereby the sub-unit can be pre-charged, shipped, installed into the front end of a vehicle engine compartment and connected to an air conditioning compressor.

10 Claims, 5 Drawing Sheets

U.S. PATENT DOCUMENTS

| | | |
|---|---|---|
| 6,276,161 B1 | 8/2001 | Peiffer et al. |
| 6,435,273 B1 * | 8/2002 | Futernik ..................... 165/202 |
| 6,449,973 B1 | 9/2002 | Dodge et al. |
| 6,457,324 B1 | 10/2002 | Zeigler et al. |
| 6,584,798 B1 * | 7/2003 | Schegerin ................... 62/386 |
| 6,662,587 B1 | 12/2003 | Rembold et al. |
| 6,742,343 B1 | 6/2004 | Matonog et al. ............... 62/77 |
| 2001/0027663 A1 | 10/2001 | Ziegler et al. |

FOREIGN PATENT DOCUMENTS

| | | |
|---|---|---|
| GB | 2387643 A | 10/2003 |
| WO | WO 01/88454 A1 | 5/2000 |

* cited by examiner

FRONT-END INTEGRAL AIR-CONDITIONING UNIT

CROSS-REFERENCES TO RELATED APPLICATIONS

This application claims the priority of provisional application No. 60/488,900 filed Jul. 21, 2003.

BACKGROUND OF THE INVENTION

1. Field of the Invention

The subject invention relates to an air conditioning sub-unit for a vehicle.

2. Description of the Related Art

In traditional air conditioning systems, a compressor, a condenser and a chiller are individually installed into an engine compartment of a vehicle and interconnected with fluid lines. After these components are interconnected with the fluid lines, the circuit is filled with a refrigerant. This process adds a large amount of time and cost to the vehicle because of the assembly time required to install the individual components and interconnect them with fluid lines plus the equipment required to charge the circuit with the refrigerant.

Various assemblies are well known for providing a self-contained air conditioning circuit that is pre-filled with a refrigerant. These assemblies allow for the elimination of the charge equipment and the processes for filling the air conditioning circuit with refrigerant during the vehicle assembly process. Additionally, these assemblies reduce the number of individual components that have to be installed into the engine compartment of a vehicle. This is accomplished by providing an air conditioning circuit that is pre-assembled and pre-charged with the refrigerant.

One such unit provides a circuit with a compressor, an evaporator, an accumulator or receiver, and a condenser which are pre-assembled onto a common support platform. Additionally, these components are interconnected to one another such that they form a complete refrigerant circuit. The circuit is pre-filled with refrigerant and sealed. Finally, the circuit is installed into the vehicle as a single sub-unit via the common support platform.

One problem with such a system is that in order to pre-fill the circuit, it requires fluid connection to the compressor. Therefore, when the compressor is added to the overall assembly, the assembly becomes larger and heavier than if it could be pre-filled without the compressor. As a result, installation of the circuit into the vehicle, with the compressor attached, may require substantial tools to aide in lifting and maneuvering the circuit into the vehicle. Additionally, some compressors are connected to the condenser and chiller at a distance requiring long fluid lines. This length could be a bar to shipping the circuit as a single pre-filled assembly.

BRIEF SUMMARY OF THE INVENTION AND ADVANTAGES

The subject invention provides a sub-unit for a refrigerant circuit including a condenser and a chiller in fluid communication with the condenser. A high pressure fluid line is coupled to the condenser and extends to a free end and a low pressure fluid line is coupled to the chiller and also extends to a free end. A refrigerant is contained in the condenser, in the chiller and in the lines. Finally, a valve is disposed on each of the free ends for retaining the refrigerant in the sub-unit.

The subject invention also provides a method of fabricating and shipping a sub-unit for a refrigerant circuit that includes a condenser, an evaporator coupled to the condenser, a high pressure fluid line coupled to the condenser and extending to a free end, and a low pressure fluid line coupled to the chiller and extending to a free end. The method comprises the steps of placing a valve on each of the ends to retain a refrigerant in the sub-unit and then charging the sub-unit with the refrigerant through one of the valves.

Accordingly, it would be advantageous to provide an air conditioning sub-assembly, independent of the compressor, which is pre-filled and self-sealing. This would facilitate ease during vehicle installation while eliminating the refrigerant charge equipment that is typically used during vehicle assembly. Further, it would be advantageous to provide an air conditioning assembly that is integrated as a single sub-unit, thereby reducing the overall packaging for the multiple components to packaging for a single sub-unit assembly.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
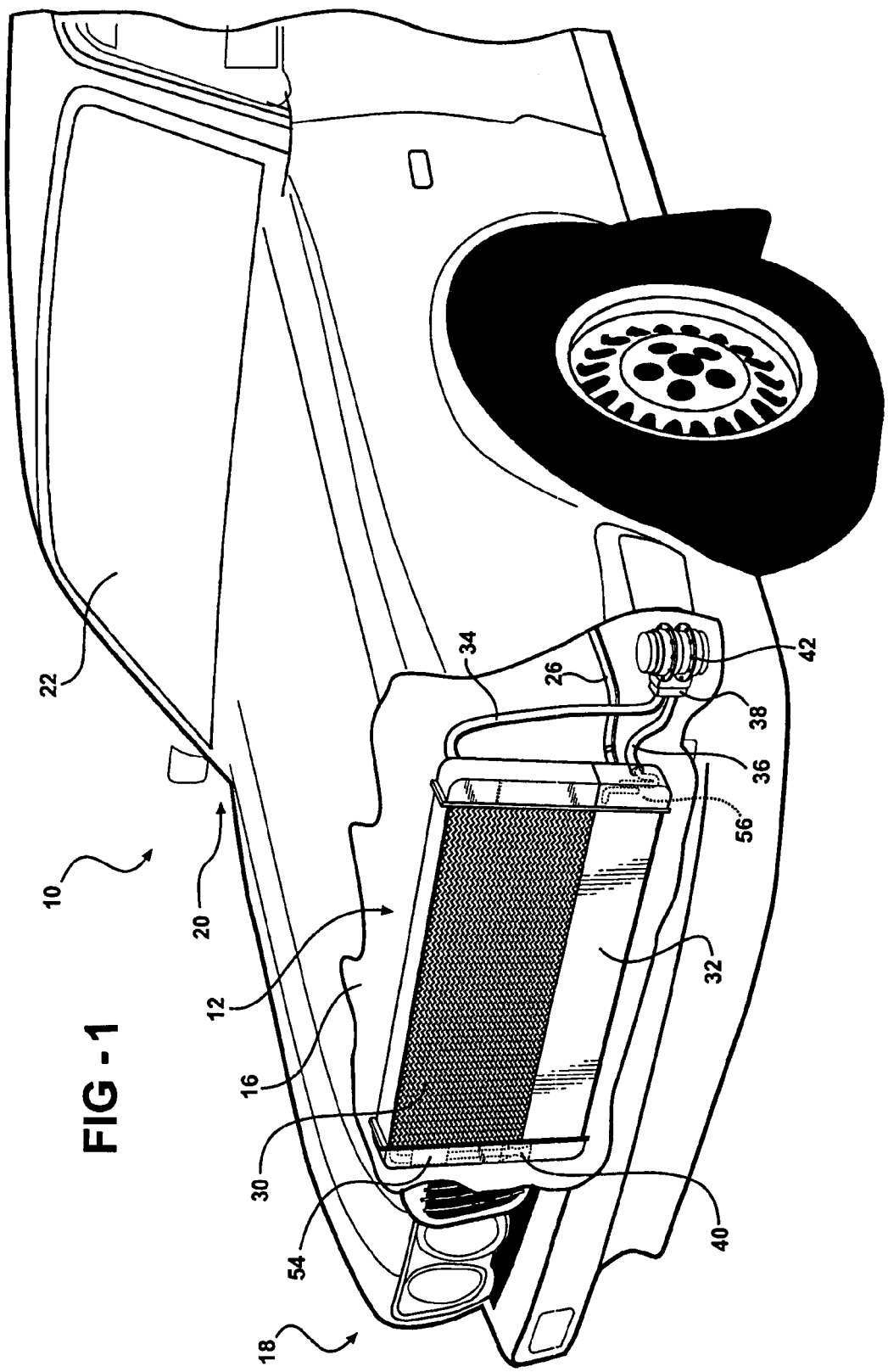
FIG. 1 is a perspective view of a sub-unit for an air conditioning circuit and compressor installed in the front of a vehicle engine compartment.
Figure 2:
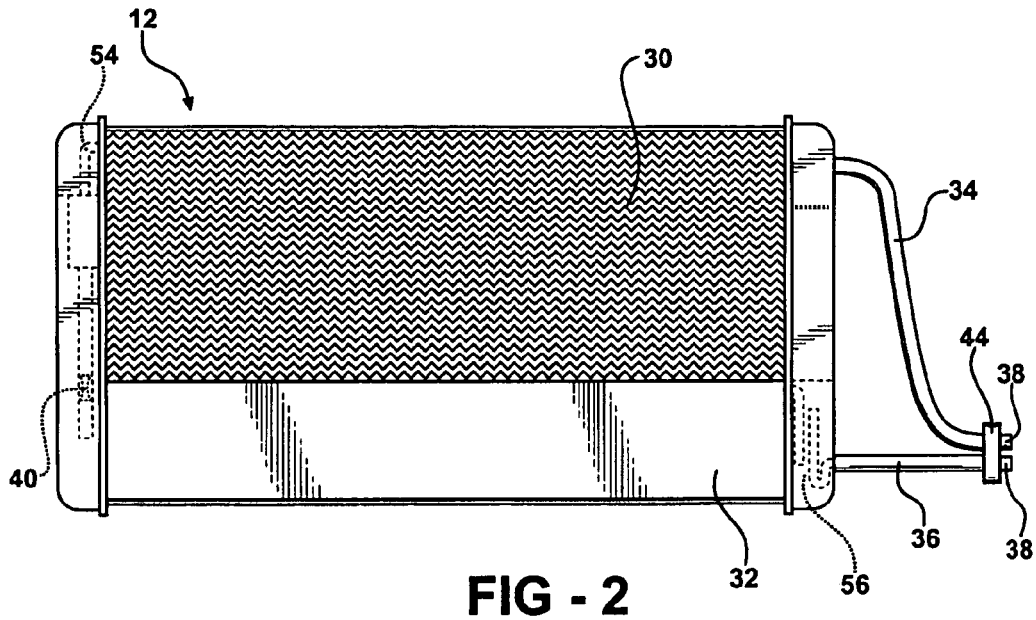
FIG. 2 is a front view of a sub-unit for an air conditioning circuit.

Referring to the Figures, wherein like numerals indicate like parts throughout the several views, a vehicle is generally shown at 10 in FIG. 1 and comprises a body 22 that defines an engine compartment 16 having a front 18 and a rear 20 disposed in spaced relationship to the front 18 and a passenger compartment 22 that is disposed proximate the engine compartment.

Figure 3:
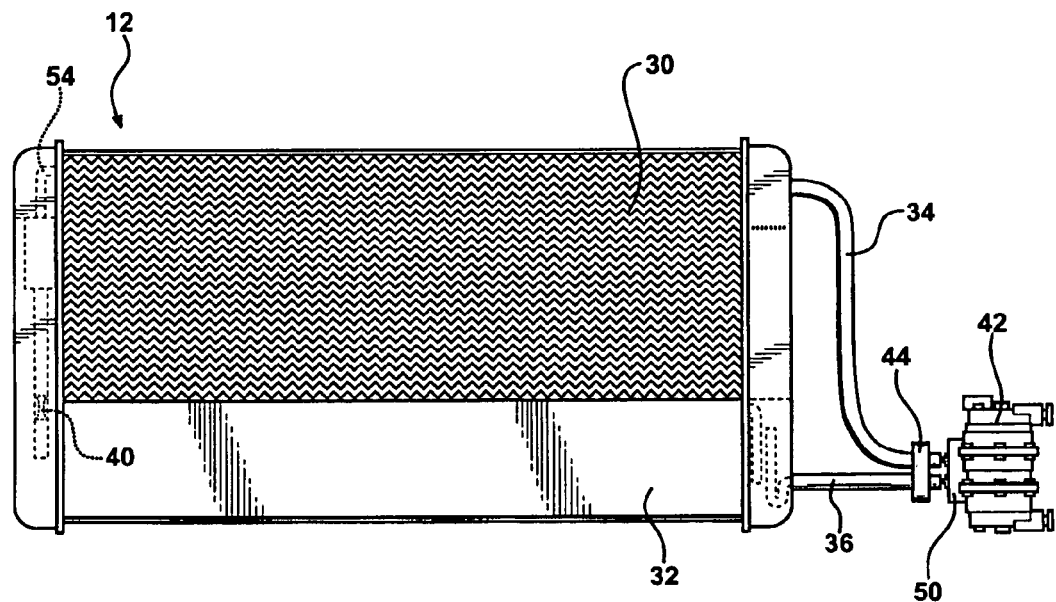
FIG. 3 is a front view of a sub-unit and a compressor for an air conditioning circuit.

An air conditioning system is disposed in the vehicle 10 and has two circuits, an air conditioning circuit and a secondary circuit. The air conditioning circuit, shown in FIG. 3, is disposed in the engine compartment 16, preferably at the front 18. The air conditioning circuit comprises a sub-unit 12 and a compressor 42. The sub-unit comprises a condenser 30 that is connected to, and in fluid communication with, a chiller 32. Preferably, the condenser 30 is disposed above the chiller 32. A high pressure fluid line 34 is coupled to the condenser 30, and a low pressure fluid line 36 is coupled to the chiller 32. Each of the lines 34, 36 extends to a free end 38. A refrigerant is contained in the chiller 32, in the condenser 30 and in the lines 34, 36.

An expansion device 40, for expanding the refrigerant received from the condenser 30, interconnects the condenser 30 and the chiller 32. A receiver 54 and/or an accumulator 56 are used in the air conditioning circuit. The receiver 54 typically interconnects the chiller 32 and the condenser 30 and serves to hold excess refrigerant, remove acid and moisture from the refrigerant, and filter debris from the air conditioning circuit. The accumulator 56 typically interconnects the chiller 32 and the free end 38 and serves to store and prevent refrigerant from entering the compressor 42 in the liquid state. The compressor 42, for the air conditioning circuit is for compressing and moving the low pressure refrigerant received from the chiller 32, through the low pressure fluid line 36, and pumping it into the condenser 30, through the high pressure fluid line 34.

The secondary circuit is a non-pressurized loop which carries a fluid, preferably a coolant, into and out of the chiller 32, through a secondary path, that is not connected to the air conditioning circuit. The fluid from the secondary circuit is cooled, by virtue of heat exchange, as it passes through the chiller 32, via the secondary circuit. This chilled fluid passes from the chiller 32 and to one or more liquid heat exchangers that are located in the vehicle passenger space 22 via coolant hoses 26. The benefit of having the primary and the secondary loops are that they permit the sub-unit 12 to be disposed anywhere in the vehicle 10 as a single unit, but preferably at the front 18 of the engine compartment 16. This location in the engine compartment 16 is ideal because it permits airflow to the condenser 30.

Figure 6:
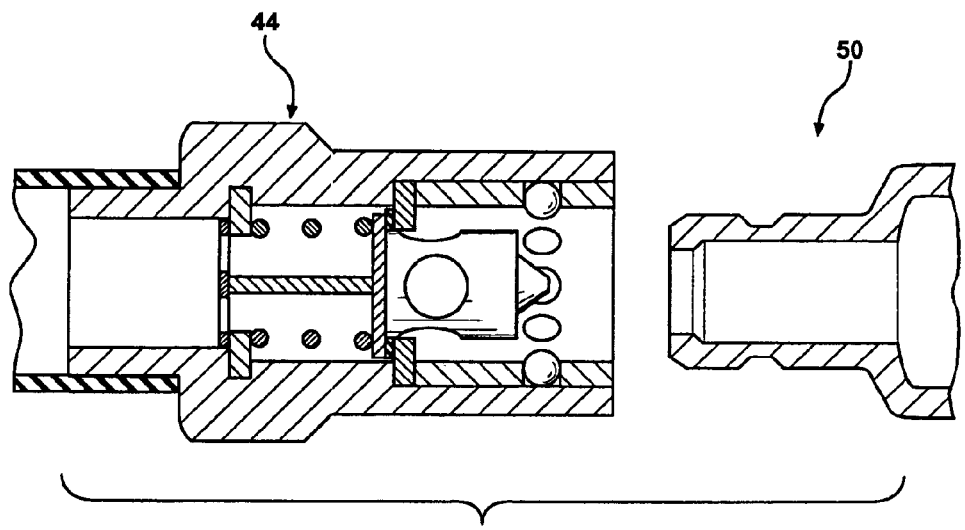
FIG. 6 is a valve unit for a sub-unit for an air conditioning circuit in the normally closed position.

By utilizing a method of fabricating, pre-charging and shipping an air conditioning sub-unit 12, the air conditioning sub-unit 12 can be assembled, charged and shipped inclusive of the refrigerant and independent of the compressor 42. The method first includes step 100 of placing a valve unit 44 on each of the ends for retaining the refrigerant in the sub-unit 12. Each of the valve units 44 has a normally closed position, shown in FIG. 6, which is movable to an open position, shown in FIG. 7, in response to connection to a connector 50. Typically, the connector 50 is in fluid communication with the compressor 42 for coupling the compressor 42 with the sub-unit 12. Therefore, when the valve units 44 are in the normally closed position, they are self-sealing and do not require a cap or plug for retention of the refrigerant. The open position allows the refrigerant to flow into and out of the lines 34, 36. The changes in valve position are facilitated by the valve unit 44 and the connector 50 defining a snap together coupling 52 that moves the valve unit 44 from the normally closed position to the open position when the valve unit 44 and the connector 50 are snapped together. Furthermore, the snap together connection 52 allows the pre-filled sub-unit 12 to be connected to the compressor 42 without leakage of the refrigerant during or after establishment of the connection.

Next, the method incorporates the step 110 of charging the sub-unit 12 with the refrigerant through one of the valve units 44. This can be accomplished by connecting a connector 50, which is coextensive with a refrigerant charge machine, to one of the valve units 44 to establish an open position. Following completion of charging the sub-unit 12, the connector 50 is removed and the closed position is automatically resumed. This filling operation is performed prior to connecting the valve units 44 to the compressor 42.

The method next includes the step 120 of shipping the sub-unit 12 with the refrigerant retained therein. As such, the sub-unit 12 can be fabricated and shipped separate from the compressor 42 with the refrigerant retained therein.

The method then comprises the step 130 of inserting the sub-unit 12 into the engine compartment 16 of the vehicle 10. Allowing the sub-unit 12 to be inserted into the engine compartment 16 as a single, pre-filled sub-unit 12 can have several benefits. The sub-unit 12 can be tested for leaks at the sub-unit 12 assembly location, prior to delivery to the vehicle 10 assembly location. Additionally, by allowing the sub-unit 12 to be pre-filled with the refrigerant, the refrigerant charging equipment, and the resultant processing, can be eliminated at the vehicle 10 assembly location.

Figure 4:
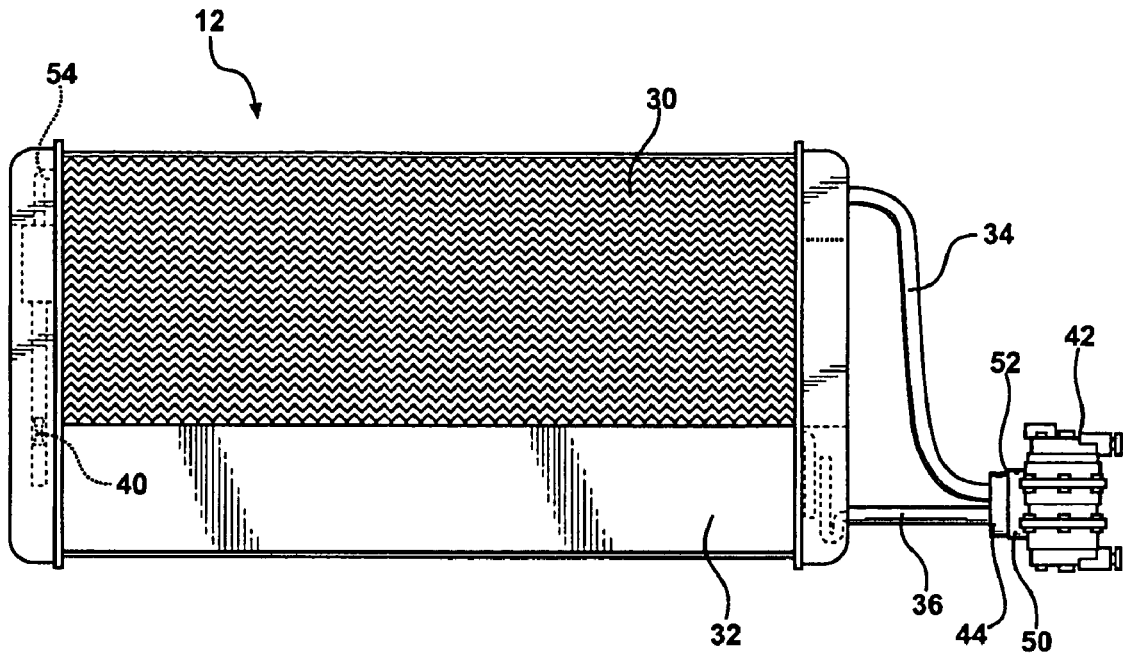
FIG. 4 is a front view of a sub-unit for an air conditioning circuit attached to an electric compressor connector.
Figure 5:
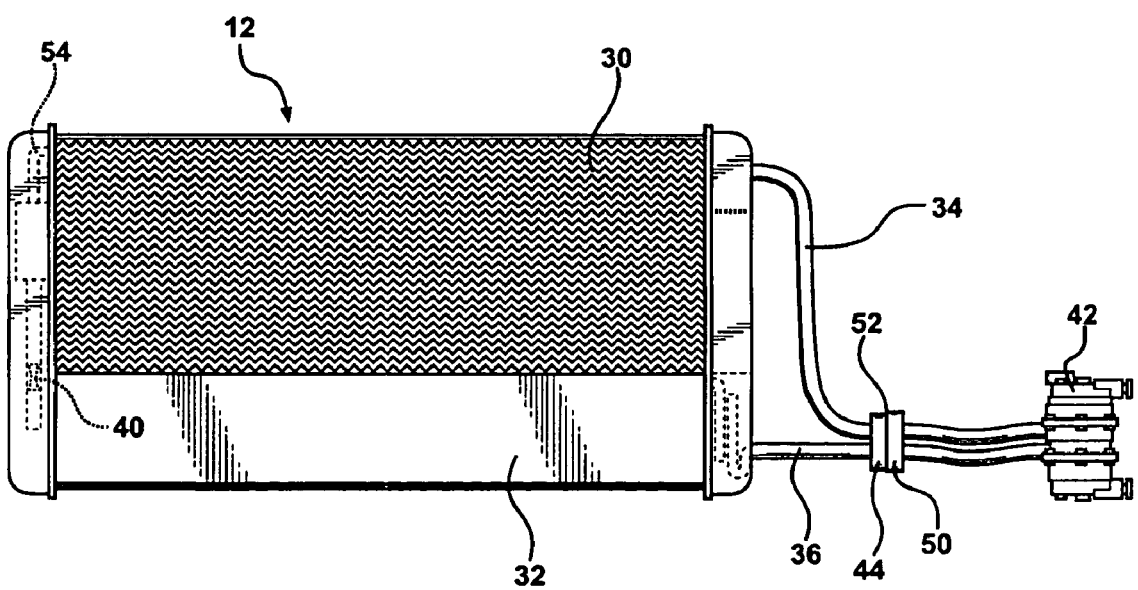
FIG. 5 is a front view of a sub-unit for an air conditioning circuit attached to an accessory drive compressor connector.
Figure 7:
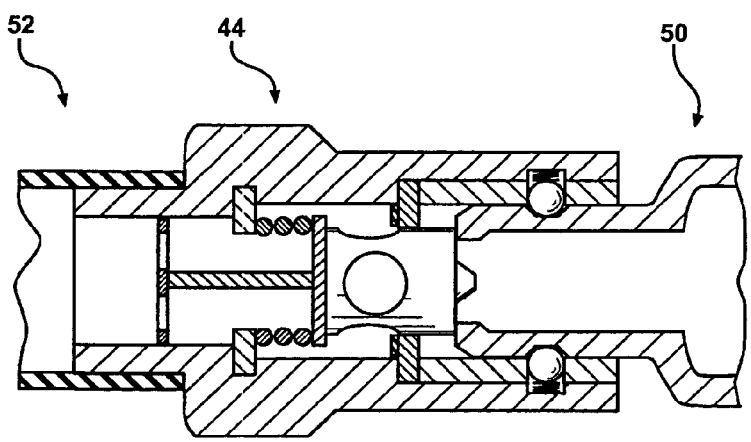
FIG. 7 is a valve unit for a sub-unit for an air conditioning circuit in an open position.
Figure 8:
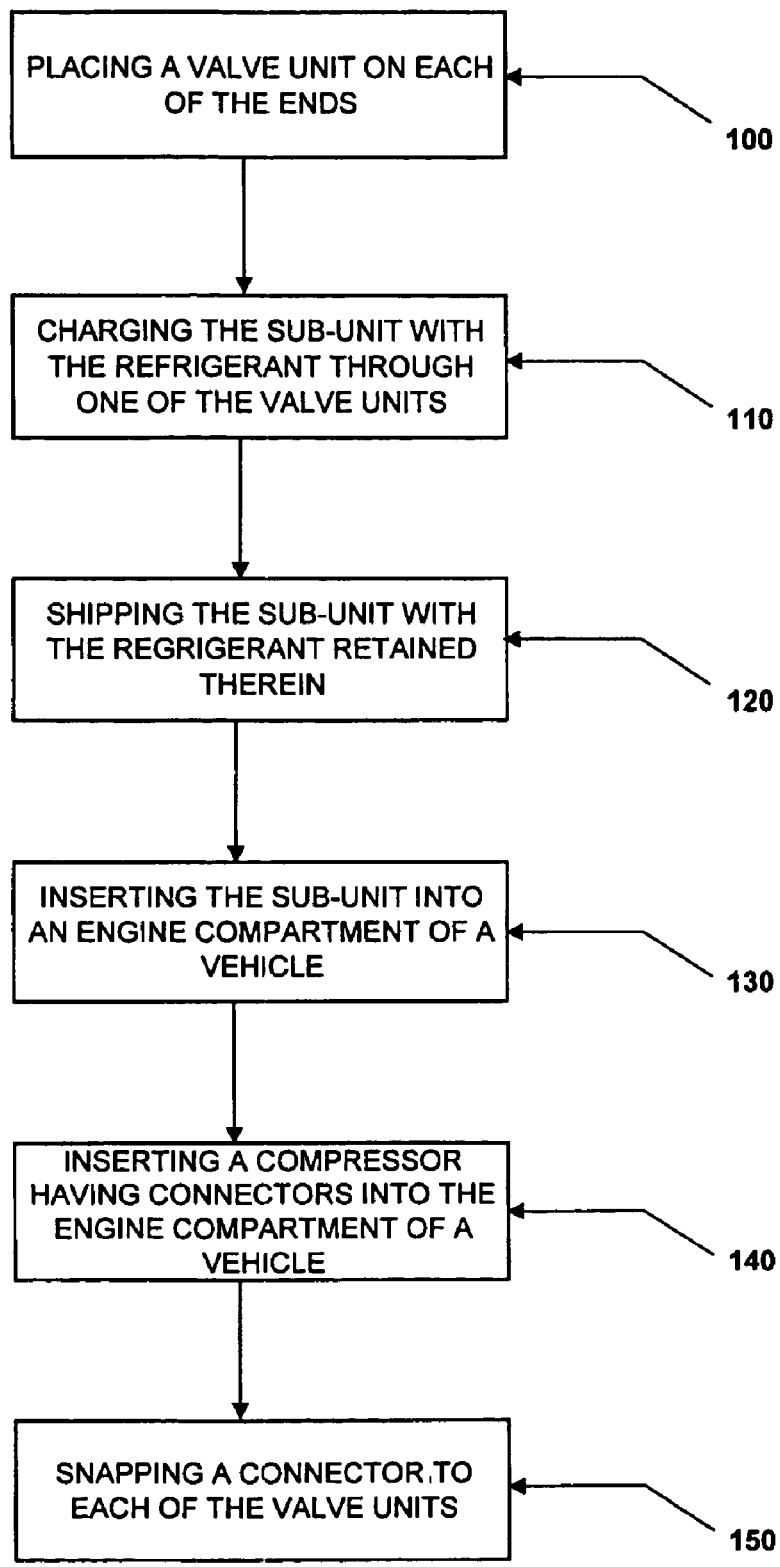
FIG. 8 is a flow diagram of a method of fabricating and shipping a sub-unit for an air conditioning circuit.

The next step 140 is inserting the compressor 42, having the connectors 50, into the engine compartment 16 of the vehicle 10. In one form, the compressor 42 can be an electric compressor, as shown in FIG. 4, which is capable of being mounted proximate the sub-unit 12. Alternatively, the compressor 42 can be an accessory drive compressor, as shown in FIG. 7, which is mounted to the engine and powered via a pulley connection to the engine. With the accessory drive option, the compressor 42 is located at a distance further from the sub-unit 12 than when using the electric compressor. Accordingly, integral high and low pressure liquid lines are required and the distance between the compressor 42 and the sub-unit 10 can dictate that the length of these integral lines is significant. These integral lines additionally require evacuation.

Finally, the method comprises the step 150 of snapping a connector 50 to each of the valve units 44 for establishing an open position between the lines and the connector 50. With the establishment of these connections, the valve units 44 move into the open position and allow the refrigerant to flow between the sub-unit 12 and the compressor 42. The valve units 44 and the connectors 50 further define the snap together couplings 52 that move the valve units 44 from the normally closed position to the open position when the valve units 44 and the connectors 50 are snapped together. The benefit of a snap together coupling 52 is that the connection is capable of being established in a single press-together action. This connection can be established without the aid of tooling and also prevents leakage of the refrigerant prior to, during and subsequent to the establishment of the snap together connection. The result of the connection is that the sub-unit 12 is in fluid communication with the compressor 42.

Obviously, many modifications and variations of the present invention are possible in light of the above teachings. In addition, the reference numerals in the claims are merely for convenience and are not to be read in any way as limiting.

What is claimed is:

1. A sub-unit for a refrigerant circuit comprising:
   a condenser;
   a chiller in fluid communication with said condenser;
   a high pressure fluid line coupled to said condenser and extending to a free end;
   a low pressure fluid line coupled to said chiller and extending to a free end;
   a refrigerant in said condenser and in said chiller and in said lines; and
   a valve unit disposed on each of said free ends for retaining said refrigerant in said sub-unit and each of said valves has a normally closed position and is movable to an open position in response to connection to a connector for allowing said refrigerant to flow into and out of said lines.

2. A sub-unit as set forth in claim 1 wherein said valve unit defines a snap together coupling with the connector that moves said valve unit to said open position when said valve unit and the connector are snapped together.

3. A sub-unit as set forth in claim 2 further comprising an expansion device interconnecting said condenser and said chiller.

4. A sub-unit as set forth in claim 3 further comprising a receiver interconnecting said chiller and said condenser.

5. A sub unit as set forth in claim 4 further comprising an accumulator interconnecting said chiller and said free end.

6. A sub-unit as set forth in claim 5 wherein said condenser is connected to said chiller.

7. A sub-unit for a refrigerant circuit comprising:

a condenser;

a chiller in fluid communication with said condenser;

said condenser is disposed above and connected to said chiller;

an expansion device interconnecting said condenser and said chiller;

a receiver interconnecting said chiller and said condenser;

a high pressure fluid line coupled to said condenser and extending to a free end;

a low pressure fluid line coupled to said chiller and extending to a free end;

an accumulator interconnecting said chiller and said free end;

a refrigerant in said condenser and in said chiller and in said lines;

a valve unit disposed on each of said free ends for retaining said refrigerant in said sub-unit and each of said valves has a normally closed position and is movable to an open position in response to connection to a connector for allowing said refrigerant to flow into and out of said lines; and said valve unit defines a snap together coupling with the connector that moves said valve unit to said open position when said valve unit and the connector are snapped together.

8. A vehicle comprising:

a body defining an engine compartment having a front and a rear in spaced relationship to said front;

a sub-unit for an air-conditioning circuit disposed within said engine compartment and including:

a condenser, a chiller in fluid communication with said condenser, a high pressure fluid line coupled to said condenser and extending to a free end, a low pressure fluid line coupled to said chiller and extending to a free end, a refrigerant in said condenser and said chiller and said lines, a connector in fluid communication with a compressor, and a valve unit disposed on each of said free ends for retaining said refrigerant in said sub-unit and each of said valve units defining a normally closed position and being movable to an open position in response to connection to said connector for allowing said refrigerant to flow into and out of said lines.

9. A sub-unit as set forth in claim 8 wherein said sub-unit is disposed at said front of said engine compartment for permitting airflow to said condenser.

10. A sub-unit as set forth in claim 9 wherein said valve unit and said connector further define a snap together coupling that moves said valve unit to said open position when said valve unit and said connector are snapped together.

* * * * *